Feb. 1, 1944.    E. G. BOYSWORTH    2,340,638
WATER HEATER
Filed Nov. 13, 1941    4 Sheets-Sheet 1

Inventor
ERNEST G. BOYSWORTH,
By Clarence A. O'Brien
Attorney

Feb. 1, 1944.  E. G. BOYSWORTH  2,340,638
WATER HEATER
Filed Nov. 13, 1941  4 Sheets-Sheet 2

Inventor
ERNEST G. BOYSWORTH;

By  Clarence A. O'Brien

Attorney

Feb. 1, 1944. E. G. BOYSWORTH 2,340,638
WATER HEATER
Filed Nov. 13, 1941 4 Sheets-Sheet 3

Inventor
ERNEST G. BOYSWORTH,

By Clarence A. O'Brien

Attorney

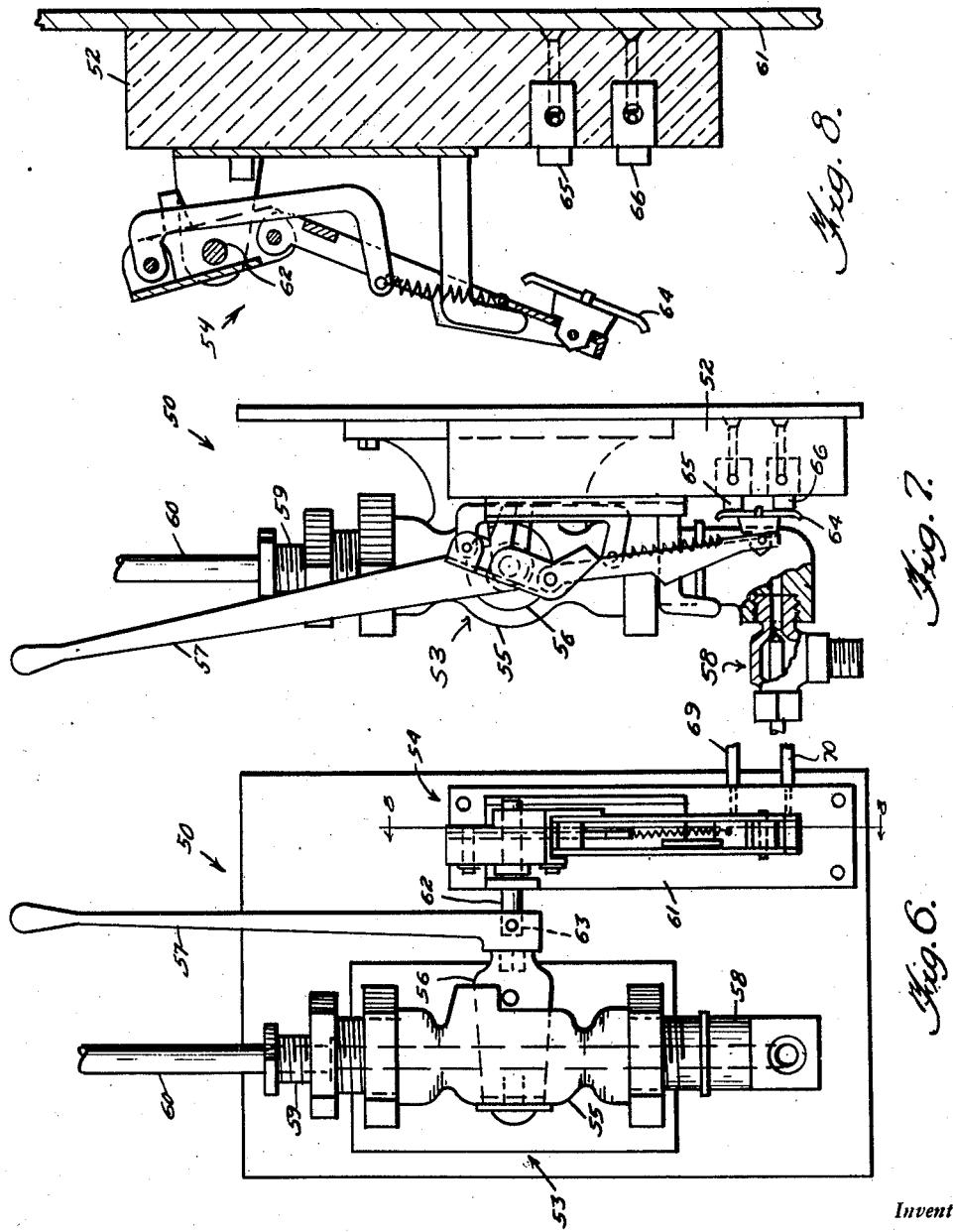

Patented Feb. 1, 1944

2,340,638

UNITED STATES PATENT OFFICE 2,340,638

WATER HEATER

Ernest G. Boysworth, Rockingham, N. C.

Application November 13, 1941, Serial No. 418,985

5 Claims. (Cl. 219—39)

My invention relates generally to improvements in water heaters, and particularly to an electrical instantaneous water heater especially constructed and devised for supplying hot water needs for soda fountains, especially small amounts of boiling water for individual servings of hot drinks, the said hot water heater also being adapted for supplying quickly small amounts of hot water in other places such as lavatories, and the like, and the primary object of my invention is to provide a simple and efficient arrangement of this character which is simple, rugged, and easily operated, and which may be constructed in an attractive form.

Other important objects and advantages of my invention will be apparent from a reading of the following description taken in connection with the appended drawings, wherein for purposes of illustration I have shown a preferred embodiment of my invention.

In the drawings:

Figure 6 is a front elevational view of the valve and switch assembly with the casing removed.

Figure 7 is a side elevational view of the valve and switch assembly with the casing removed.

Figure 8 is an enlarged transverse vertical sectional view taken along the line 8—8 of Figure 6 and looking toward the left in the direction of the arrows, and showing the switch in the open position.

Figure 3:
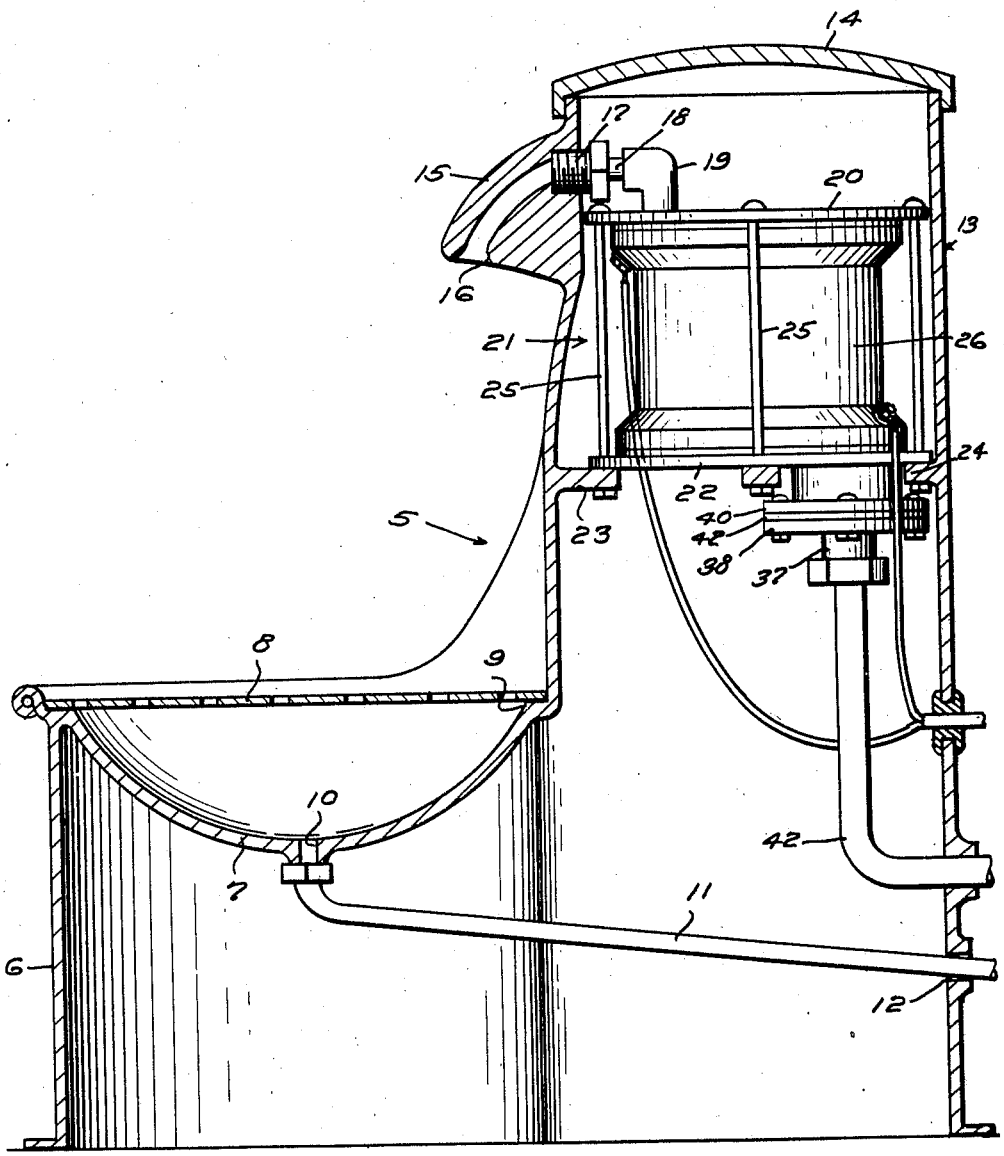
Figure 3 is an enlarged longitudinal vertical sectional view taken through Figure 1.
Figure 4:
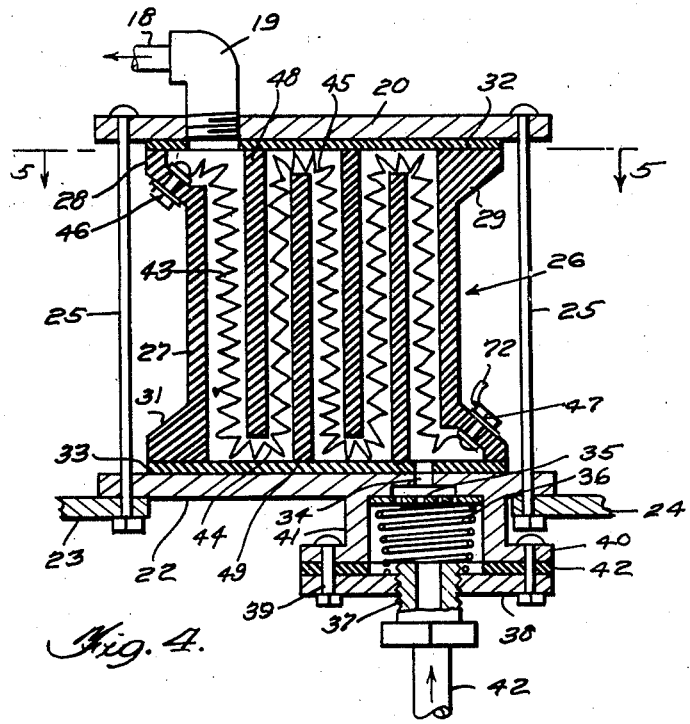
Figure 4 is a transverse vertical sectional view, enlarged and taken through the boiler in Figure 3.

Referring in detail to the drawings, the numeral 5 generally designates the hot water heater housing which comprises a substantially cylindrical basin containing portion 6 in the upper part of which is formed a basin 7 whose upper end is closed by a perforated plate 8 resting on a ledge 9, and whose bottom is connected at 10 with a drain pipe 11 which leads through the side wall of the housing at 12 to a suitable waste pipe connection (not shown). The side walls of the basin containing portion 6 merge into semi-circular walls of smaller diameter, constituting the lower part of the vertical cylindrical heater containing portion 13 which rises to a substantial height above the top of the basin and is provided on its upper end with a removable cover 14. Overhanging the basin is a bill-shaped spout 15 which has a downwardly curved passage 16 emptying into the basin 7, with a nipple 17 in communication with the upper end of the said passage. A short pipe 18 connects the nipple 17 with the elbow 19 which is threaded into the upper plate 20 of the heater which is generally designated 21. A lower plate 22 is placed below the plate 20 and rests on bracket portions 23 and 24 on the interior of the upper part of the heater housing portion 13 above the level of the basin 7 as shown in Figure 3 of the drawings. Bolts 25 pass through the upper and lower plates 20 and 22 and through the brackets 23 and 24, assembling the said plates with respect to the upper and lower ends of the boiler 26. The boiler is preferably formed of nonmetallic material and comprises a cylindrical main portion 27 and an annular portion 28 of larger diameter joined to the upper part of the portion 27 by a beveled portion 29. A lower annular portion at the lower end of the portion 27 is connected to the portion 27 by a beveled portion 31. Suitable upper and lower gaskets 32 and 33, respectively, are interposed between the upper plate 20 and the upper end of the boiler, and between the lower plate 22 and the lower end of the boiler, respectively, as shown in Figure 4 of the drawings. The elbow 19 opens eccentrically in the upper part of the boiler, specifically the upper terminal end of the water passage therein. The lower plate 22 is eccentrically apertured as indicated by the numeral 34 to communicate with the opposite side of the boiler from the elbow 19, and the remaining terminal of the continuous water passage through the heater. A perforated plate or strainer 35 is held up against the lower side of the lower plate 22 across the enlarged lower part of the opening 34 by an inverted conical helical spring 36 whose lower end is circumposed on a bushing 37 traversing a retainer plate 38 which is secured by bolts 39 to a flange 40 on the lower end of a reduced cylindrical chamber 41 depending from around the opening 34, with a gasket 42 interposed between the flange and the plate 38. The tension of the spring 36 holds the perforated plate 35 up in place. A cold water supply pipe 42 is connected to the bushing 37 from a suitable source of water supply (not shown).

Figure 5:
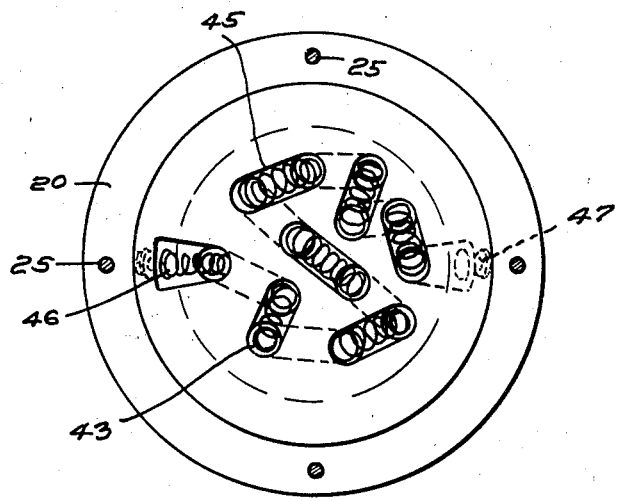
Figure 5 is a horizontal sectional view taken along the line 5—5 of Figure 4 and looking downwardly in the direction of the arrows.

As shown in Figures 4 and 5, the cylindrical portion 27 of the boiler 26 surrounds a series of laterally spaced substantially parallel vertical flights 43 of suitable resistance wire connected alternately at upper and lower ends by resistance wire portions 44 and 45 to form a continuous electrical heating element having one terminal connected to the binding post 47 at the entrance of the water passage, and the remaining terminal connected to the binding post 46 at the exit of the water passage. The adjacent flights 43 are spaced from each other by partitions 48 which are spaced at their lower ends from the lower ends of the alternating partitions 49, the latter having their upper ends vertically spaced with respect to the upper ends of the elevated partitions 48, as clearly shown in Figure 4. As indicated in Figure 5, the partitions and the vertical portions of the continuous water passage defined thereby, in which the flights of the resistance wire are situated, are irregularly placed with respect to each other so as to form a serpentine plan constituted by a series of neighboring pairs of vertical portions, the walls of said vertical portions being formed of substantially the same material as the outer walls of the boiler 26. As shown in Figure 4 of the drawings, the upper and lower ends of the said vertical portions are closed by the plates 20 and 22 and their gaskets 32 and 33. It is obvious that cold water entering via the pipe 42 will pass upwardly through the perforated plate 35, through the opening 34 into the lower terminal of the single continuous water passage in contact with the various flights of the electrical heating elements, and continue on upwardly into the nipple 19, the pipe 18 and discharge through the passage 16 in the spout or nozzle 15 and fall into the basin 7 or into any vessel, such as a glass or cup or other receptacle placed on the perforated plate 8.

At a suitable location, such as on an adjacent wall or other adjacent support, from which the control lever can be handily reached by the operator, is located the valve and switch assembly which is generally designated 50 and which includes a suitable casing 51 enclosing a dielectric base 52 on the face of which is mounted the valve which is generally designated 53 and the switch which is generally designated 54.

The valve 53 may be of a conventional type of two position cut-off valve involving an elongated valve casing 55 in which is arranged a rotary valve plug 56 having an elongated hand lever 57 for its operation, the valve casing terminating in an adjustable needle valve connection 58 with the pipe 42 which discharges into the lower part of the boiler, the upper end of the valve casing terminating in a reducing fitting 59 which is connected to the water supply pipe 60, which may be the ordinary city water supply. The hand lever 57 is arranged relative to the valve in such a way that in its substantially vertical position shown in Figures 6 and 7 the valve 53 is in the open position so as to permit the water from the water supply pipe 60 to pass into the boiler water intake pipe 42.

Figure 1:
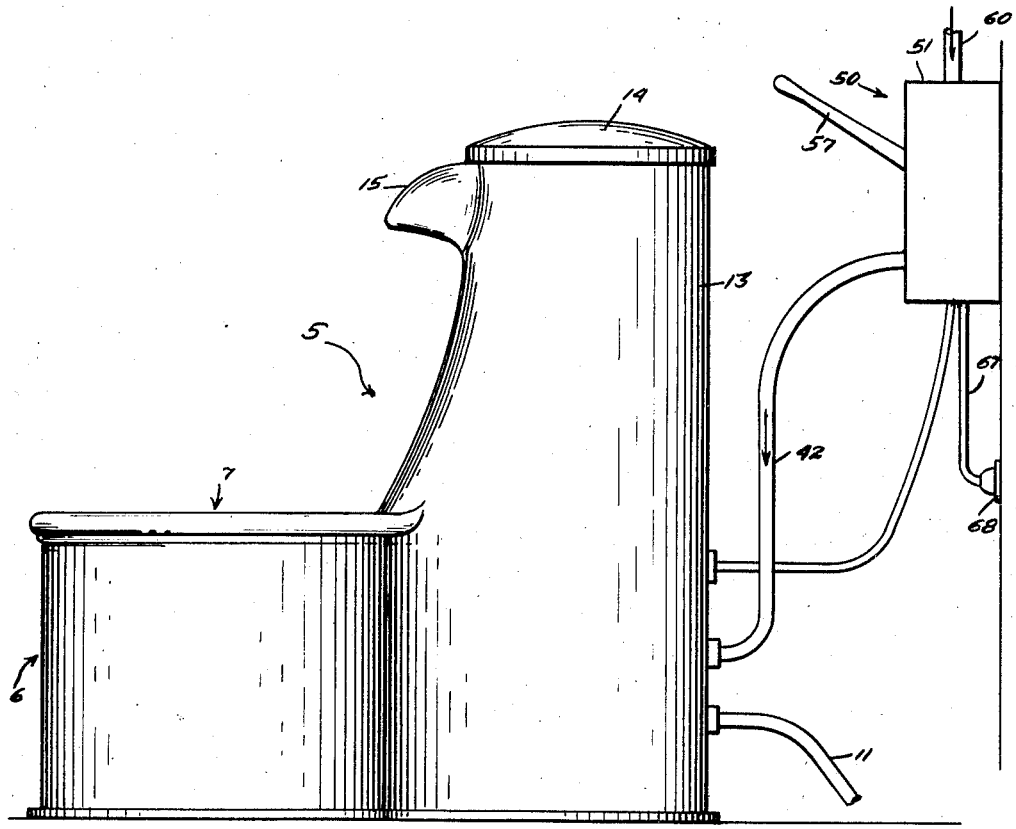
Figure 1 is a general side elevational view of the embodiment.
Figure 2:
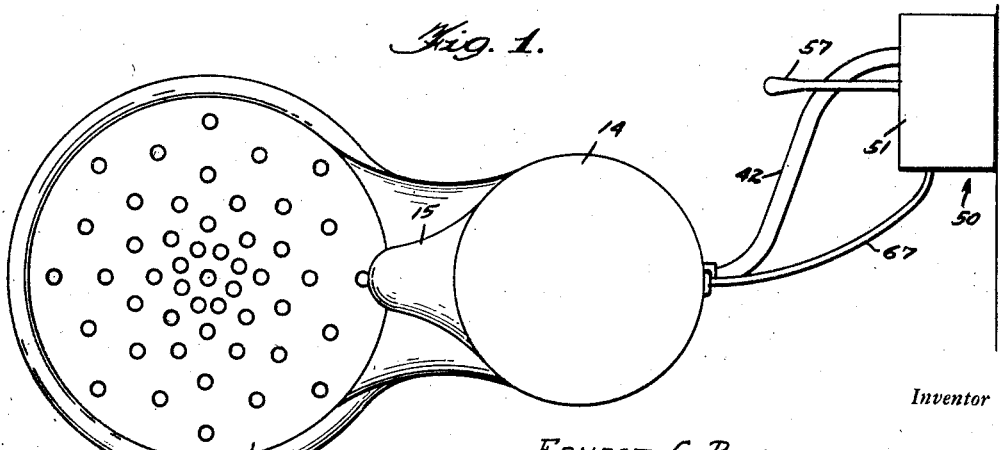
Figure 2 is a top plan view of Figure 1.

Mounted alongside of the valve 53 is the over-center switch 54 which includes a base 61 and may be of a conventionally available type including the rotary operating shaft 62 which in this case is non-rotatably coupled as indicated at 63 to the hand lever 57 concentrically with respect to the valve plug 56, so that when the handle is operated it will turn the switch operating shaft 62. In the substantially vertical position of the lever 57 shown in Figures 6 and 7, the switch is in the closed position with its bridging contactor 64 electrically engaging and bridging the contact points 65 and 66 which are mounted in the dielectric base 52 as shown in Figures 6 and 7. In Figure 8 the switch is shown in the open position in which the bridge 64 is disengaged from the contact points 65 and 66. The control lever 57 is exposed for manual operation through a suitable aperture in the enclosing casing 51, as indicated in Figures 1 and 2 of the drawings. In the switch arrangement shown, when the same is adjusted by operation of the lever 57 into closed position, it will maintain this position due to over-center action and no persistent holding of the lever 57 is required to hold the closed position of the switch. In the open position of the switch, Figure 8, the switch maintains itself open, without any further adjustment of the lever 57; until the lever should be moved substantially out of the position corresponding to the position of the switch then obtaining. A suitable conduit 67 leads from the valve and switch assembly casing 50 for connection with a current outlet as indicated by the numeral 68, the said conduit containing the wires 69 and 70 leading from the corresponding switch points 65 and 66, a suitable arrangement of wires 71 and 72 making electrical connection with the binding posts 46 and 47, for energization of the electrical heating element in the boiler when the switch points 65 and 66 are bridged, with the valve in the open position.

With the valve 53 having its control lever 57 operated to the open position shown in Figures 6 and 7, and the switch bridge 64 closed water will pass from the supply into the cells of the boiler 26, simultaneously with the electrical energization of the heating element, so that the energization being sufficient and the heating element being adequate, the water is substantially instantly boiled on its way through the boiler for discharge through the nozzel 15, so that boiling water is deposited into the basin or into the vessel which is supported on its grating 8. When sufficient boiling water has been made in this manner, it is only necessary to pull the lever 57 downwardly from the position shown in Figures 6 and 7, to the simultaneous valve closing and switch opening position, in Figure 8 so as to cut off the flow of water from the supply to the boiler and simultaneously deenergize the heating element by opening the switch.

The needle valve 58 is arranged within the casing 51, and is provided to enable compensating for changes in the pressure of the city water supply, so as to ensure uniform operation of the device.

Although I have shown and described herein a preferred embodiment of my invention, it is to be undestood that I do not wish to limit the application of the invention thereto except as may be required by the scope of the subjoined claims.

Having described the invention, what is claimed as new is:

1. In an instantaneous water heater of the type comprising an exterior housing including a heated water discharge conduit, a heater comprising a body having substantially plane ends provided respectively with water inlet and outlet, a plurality of vertically extending, laterally spaced water passages formed in said body, said passages opening through the respective ends of the body, some of the laterally adjacent passages being connected in communication at the inlet end and other laterally adjacent passages being connected in communication at the outlet end, whereby said passages form a continuous water heating conduit starting at the inlet end of said body and terminating at the outlet end of said body, said water heating conduit alternating in opposite vertical directions, a plate overlying the outlet end of said body and closing the corresponding ends of said passages, said outlet end plate being formed with an opening registered with the terminus of the water passage and connected in communication with said heated water discharge conduit, a plate engaging the inlet end of said body and closing the corresponding ends of said passages, said inlet end plate being formed with an opening communicating with the terminus of the water passage, a cold water inlet connected in communication with the last mentioned opening, assembling means holding said end plates removably in place, and a substantially continuous electrical heating element extending through said water heating conduit from a point adjacent to said cold water inlet to a point adjacent to said heated water discharge conduit and hand operated means for simultaneously opening and/or closing said water supply and the electric heating circuit.

2. An instantaneous water heater according to claim 1 wherein said body is of non-metallic material and said plates are of metal.

3. An instantaneous water heater according to claim 1 wherein said cold water inlet comprises a chamber formed to depend from said inlet plate around the opening thereof, said chamber having a cold water conduit connected with the corresponding part thereof.

4. A combined valve and switch for simultaneously supplying water and heating it in a boiler comprising a valve body having a rotary valve element therein for controlling the passage of water through the valve body, a rock shaft substantially axially aligned with and operatively connected with said rotary valve element, an operating lever operatively connected to said valve element and said rock shaft, a common support for said valve and said rock shaft, a spring actuated over-center switch arm with a bridge operatively connected to said rock shaft, and contact points on said support arranged to be engaged by said switch arm bridge to close a heating circuit in the open position of said rotary valve element said bridge and rock shaft having contrary motion.

5. A combined valve and switch according to claim 4 wherein said switch arm comprises a first section pivoted on said support and a second section pivoted on said first section, said second section carrying said bridge for engaging the said contact points.

ERNEST G. BOYSWORTH.